United States Patent
Martin et al.

(10) Patent No.: US 10,375,891 B2
(45) Date of Patent: Aug. 13, 2019

(54) AGRICULTURAL DEVICE

(71) Applicants: Charles H. Martin, Loysville, PA (US); Dominic R. Martin, Loysville, PA (US)

(72) Inventors: Charles H. Martin, Loysville, PA (US); Dominic R. Martin, Loysville, PA (US)

( * ) Notice: Subject to any disclaimer, the term of this patent is extended or adjusted under 35 U.S.C. 154(b) by 51 days.

(21) Appl. No.: 15/634,192

(22) Filed: Jun. 27, 2017

(65) Prior Publication Data

US 2018/0007834 A1 Jan. 11, 2018

Related U.S. Application Data

(60) Provisional application No. 62/358,380, filed on Jul. 5, 2016.

(51) Int. Cl.

| | |
|---|---|
| *A01D 75/30* | (2006.01) |
| *A01D 34/835* | (2006.01) |
| *A01D 34/71* | (2006.01) |
| *A01D 34/80* | (2006.01) |
| *A01D 34/00* | (2006.01) |
| *A01D 34/66* | (2006.01) |

(Continued)

(52) U.S. Cl.
CPC ......... *A01D 75/303* (2013.01); *A01D 34/006* (2013.01); *A01D 34/661* (2013.01); *A01D 34/71* (2013.01); *A01D 34/80* (2013.01); *A01D 34/835* (2013.01); *A01D 34/8355* (2013.01); *A01B 39/18* (2013.01); *A01D 2101/00* (2013.01)

(58) Field of Classification Search
CPC .... A01D 75/303; A01D 34/006; A01D 34/71; A01D 34/80; A01D 34/8355; A01D 34/661; A01D 34/835

USPC ................ 56/6, 7, 11.9, 15.9; 172/313, 314; 280/411.1

See application file for complete search history.

(56) References Cited

U.S. PATENT DOCUMENTS 2,669,079 A  2/1954  Landry
3,068,630 A * 12/1962  Caldwell .............. A01D 34/661
                                                          280/411.1

(Continued)

FOREIGN PATENT DOCUMENTS

| EP | 2997802 A1 | 3/2016 |
| GB | 696973 A | 9/1953 |
| WO | 2014023290 A1 | 2/2014 |

OTHER PUBLICATIONS

W.W. Donald et al., "Between-Row Mowing + Banded Herbicide to Control Annual Weeds and Reduce Herbicide Use in No-till Soybean (*Glycine max*) and Corn (*Zea mays*)," Weed Technology. vol. 15: 576-584 (2001). http://www.ars.usda.gov/sp2UserFiles/Place/50701000/cswq-0044-116209.pdf.

(Continued)

*Primary Examiner* — Robert E Pezzuto
(74) *Attorney, Agent, or Firm* — McNees Wallace & Nurick LLC

(57) ABSTRACT

An agricultural device associated with reduced tillage techniques in a field includes a frame and at least one mower module supported by the frame, the at least one mower module positionable to cut plant matter between adjacent crop rows in the field. The plant matter has penetrated a previously formed mat of at least partially crushed residual plant matter.

16 Claims, 5 Drawing Sheets

(51) Int. Cl.
*A01D 101/00* (2006.01)
*A01B 39/18* (2006.01)

(56) References Cited

U.S. PATENT DOCUMENTS

| | | | | |
|---|---|---|---|---|
| 3,115,739 | A | * | 12/1963 | Thoen .................. A01D 34/863 172/117 |
| 3,665,685 | A | * | 5/1972 | Allard .................. A01D 34/863 56/10.4 |
| 3,921,726 | A | | 11/1975 | Connor et al. |
| 4,121,669 | A | | 10/1978 | Sosalla |
| 4,206,580 | A | * | 6/1980 | Truax .................. A01D 34/866 56/10.4 |
| 4,403,662 | A | | 9/1983 | Dietrich, Sr. |
| 4,491,183 | A | * | 1/1985 | Anderson ............ A01B 39/166 172/100 |
| 4,697,404 | A | * | 10/1987 | Brockmeier ........... A01D 75/30 172/308 |
| 4,834,189 | A | | 5/1989 | Peterson et al. |
| 5,280,695 | A | * | 1/1994 | Nunes, Jr. .............. A01D 75/30 56/13.5 |
| 5,333,694 | A | | 8/1994 | Roggenbuck et al. |
| 5,435,117 | A | * | 7/1995 | Eggena .................. A01D 34/27 56/10.2 D |
| 6,546,707 | B2 | * | 4/2003 | Degelman ............ A01D 34/661 56/15.2 |
| 6,557,646 | B1 | | 5/2003 | Hurtis et al. |
| 6,681,868 | B2 | | 1/2004 | Kovach et al. |
| 6,860,093 | B2 | * | 3/2005 | Scordilis .............. A01D 34/863 56/15.2 |
| 6,959,528 | B1 | * | 11/2005 | Scordilis .............. A01D 34/863 56/15.2 |
| 7,634,869 | B1 | | 12/2009 | Williams, Jr. |
| 7,640,995 | B2 | | 1/2010 | Knobloch |
| 7,762,345 | B2 | | 7/2010 | Rozendaal et al. |
| 8,020,629 | B1 | | 9/2011 | McFarlane et al. |
| 8,027,770 | B2 | | 9/2011 | Poulsen |
| 8,196,672 | B2 | | 6/2012 | Rozendaal et al. |
| 8,235,132 | B2 | | 8/2012 | Condrey |
| 8,393,137 | B1 | | 3/2013 | Crosby |
| 8,479,483 | B1 | | 7/2013 | Huseman et al. |
| 8,534,374 | B2 | | 9/2013 | Hake et al. |
| 8,770,119 | B1 | | 7/2014 | Kornecki et al. |
| 8,887,824 | B1 | | 11/2014 | Johnson et al. |
| 9,003,983 | B2 | | 4/2015 | Roth et al. |
| 9,148,989 | B2 | | 10/2015 | Van Buskirk et al. |
| 9,241,438 | B2 | | 1/2016 | Bassett |
| 9,282,688 | B2 | | 3/2016 | Casper et al. |
| 9,307,689 | B2 | | 4/2016 | Adams et al. |
| 9,320,189 | B2 | | 4/2016 | Nance |
| 2013/0000535 | A1 | | 1/2013 | Martin et al. |
| 2014/0060864 | A1 | | 3/2014 | Martin et al. |
| 2015/0216105 | A1 | | 8/2015 | Butler |

OTHER PUBLICATIONS

"Trailed side-pull 630/635," John Deere, deere.com. accessed: Jun. 2016. https://www.deere.com/en_INT/products/equipment/mower_conditioner/trailed_side_pull_630_635/trailed_side_pull_630_635. page.

"Disk Rippers," CaseIH, caseih.com, Apr. 29, 2015. https://web.archive.org/web/20150429162335/http://www.caseih.com/northamerica/en-us/products/tillage/disk-rippers.

"Disk Bedders," Buctraco, buctraco.com, Jan. 10, 2015. https://web.archive.org/web/20150110112139/http://www.buctraco.com/3%20Online%20Catalog/DiskBedders.htm.

"Inter Row Rotary Cultivator," Minos, minosagri.com, Mar. 20, 2013. https://web.archive.org/web/20130320022933/http://www.minosagri.com/inter-row-cultivator.

* cited by examiner

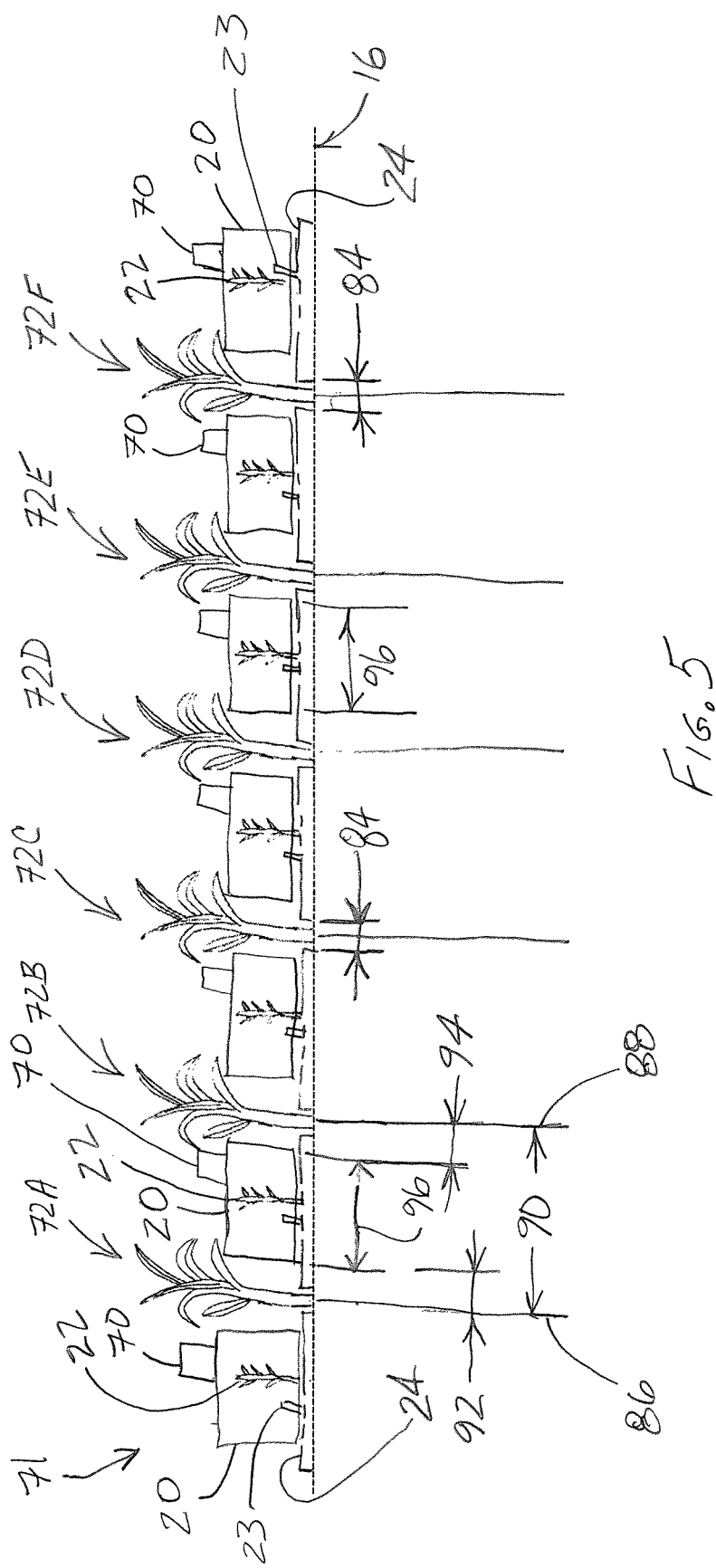

AGRICULTURAL DEVICE

FIELD OF THE INVENTION

The present invention is generally directed to agricultural devices, and is more particularly directed to an agricultural device configured for organic and other high residue weed control in a row crop program.

BACKGROUND OF THE INVENTION

"No till" farming has recently gained popularity among conservationists and economically minded farmers as a way to reduce erosion, fuel consumption, irrigation and fertilizer runoff. The "no till" concept removes the step of tilling a previous crop prior to planting the next successive crop.

Due to increased attention on water runoff holding of agricultural nutrients and erosion concerns and herbicide resistant weeds, there is gaining popularity of growing large cover crops between cash crops in the late fall and early spring time period. The cover crops are then rolled down or pushed over to create a thick mat of residue that addresses most of these concerns. Although Applicant has observed significantly reduced weed growth due to the high residue, weed growth may still occur as a result of weeds growing through the mat of residue, causing problems at later stages of the crop cycle.

BRIEF DESCRIPTION OF THE INVENTION

In an exemplary embodiment, an agricultural device associated with reduced tillage techniques in a field includes a frame and at least one mower module supported by the frame, the at least one mower module positionable to cut plant matter between adjacent crop rows in the field. The plant matter has penetrated a previously formed mat of at least partially crushed residual plant matter.

In another exemplary embodiment, an agricultural device associated with reduced tillage techniques in a field includes a frame and at least two mower modules supported by the frame, the at least two mower modules positionable to cut plant matter at at least one of between adjacent crop rows in the field, and between an outer crop row and an adjacent crop row in the field and along a side of the outer crop row opposite the adjacent crop row. The plant matter has penetrated a previously formed mat of at least partially crushed residual plant matter.

In a further exemplary embodiment, a method for achieving reduced tillage techniques in a field includes forming at least two strips of exposed soil in residual plant matter in the field, at least partially crushing stems of residual plant matter while maintaining the strips, the at least partially crushed residual plant matter forming a mat. The method further provides planting crops in the strips, forming crop rows; and cutting plant matter between adjacent crop rows in the field, wherein the plant matter having penetrated the previously formed mat of at least partially crushed residual plant matter.

Other features and advantages of the present invention will be apparent from the following more detailed description of the preferred embodiment, taken in conjunction with the accompanying drawings, which illustrate, by way of example, the principles of the invention.

BRIEF DESCRIPTION OF THE DRAWINGS

FIG. 5 is an end view of an exemplary agricultural device positioned relative to multiple crop rows, according to the present disclosure.

Wherever possible, the same reference numbers will be used throughout the drawings to represent the same parts.

DETAILED DESCRIPTION OF THE INVENTION

Figure 1:
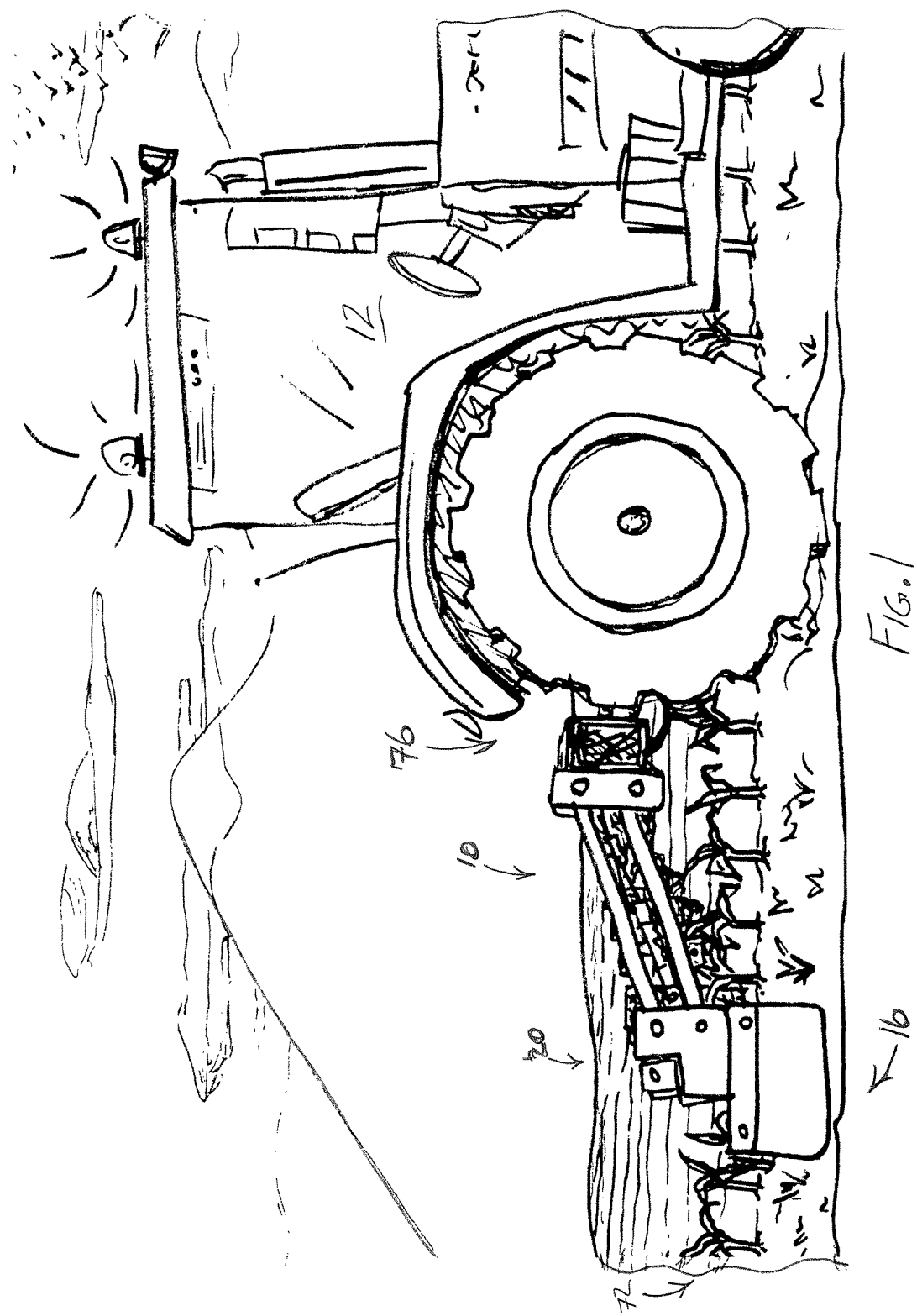
FIG. 1 is an elevation view of the tractor pulling an exemplary agricultural device, according to an embodiment of the present disclosure.
Figure 2:
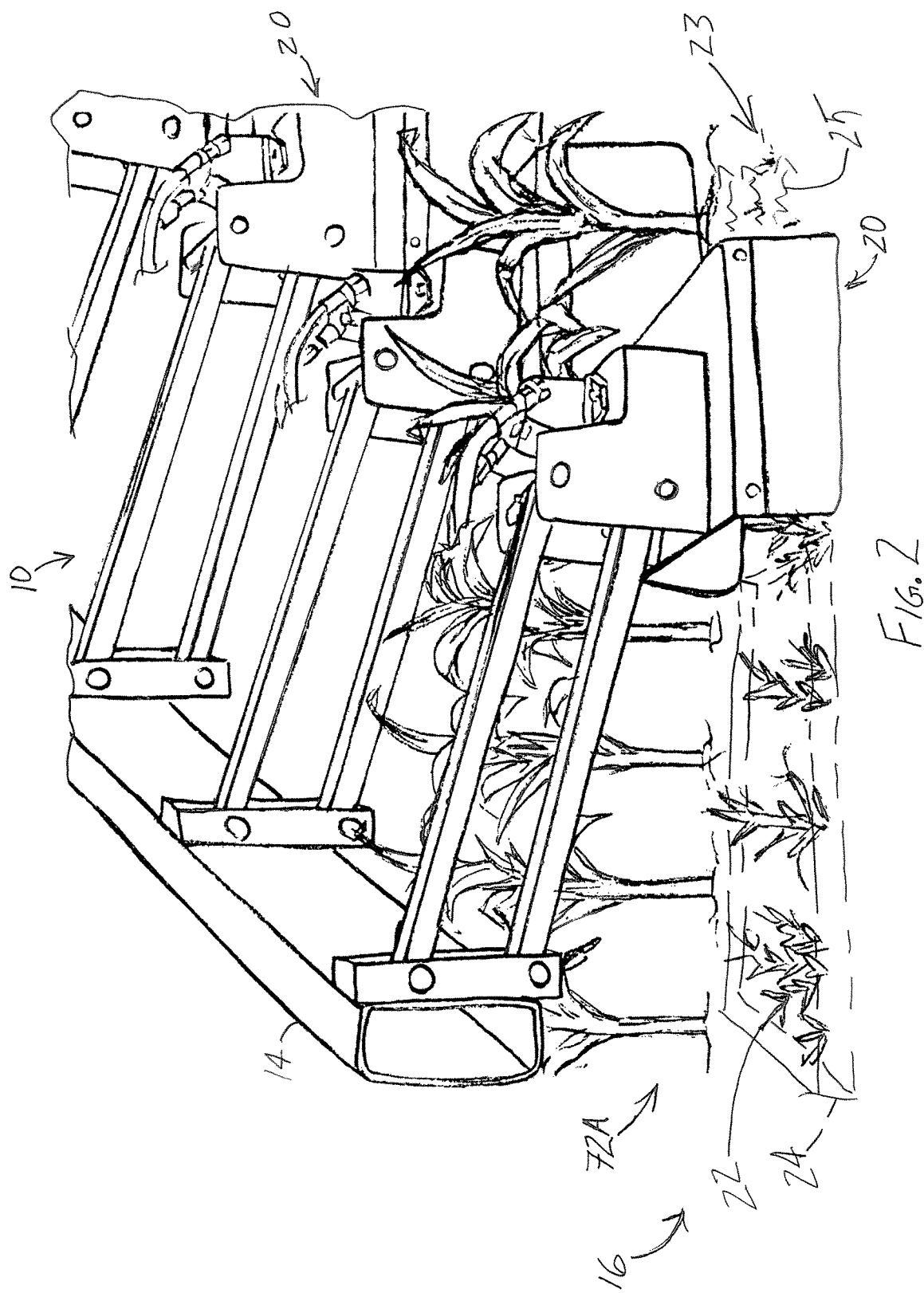
FIG. 2 is an enlarged, partial reverse upper perspective view of the agricultural device of FIG. 1, according to the present disclosure.

The agricultural device 10 disclosed herein as shown in enclosed FIGS. 1-5 is generally directed to address weeds 22 that have penetrated the previously formed mat 24 of at least partially crushed residual plant matter and will pose a problem later in the crop cycle, without resorting to tilling of the field 16. As shown in FIGS. 1 and 2, mower modules 20 of agricultural device 10 can advantageously cut plant matter or weeds 22 off at ground level at or close to the crop canopy closure or close in of crop row 72, becoming cut plant matter or cut weeds 23, which crop canopy closure blocks out sunlight to cut weeds 23, significantly reducing the opportunity for the cut weeds 23 to pose problems later in the crop cycle in response to being moved or carried in a direction of travel by a tractor 12. Additionally, agricultural device 10 device can be used without the high residue mat 24 or possibly at earlier stages of the crop cycle.

A detailed discussion of the mat 24 formed of at least partially crushed residual plant matter and implements used therewith may be found, for example, in U.S. Pat. No. 9,271,437, titled AGRICULTURAL FIELD PREPARATION DEVICE, having the same inventors as in the present application, which is herein incorporated by reference in its entirety.

Figure 3:
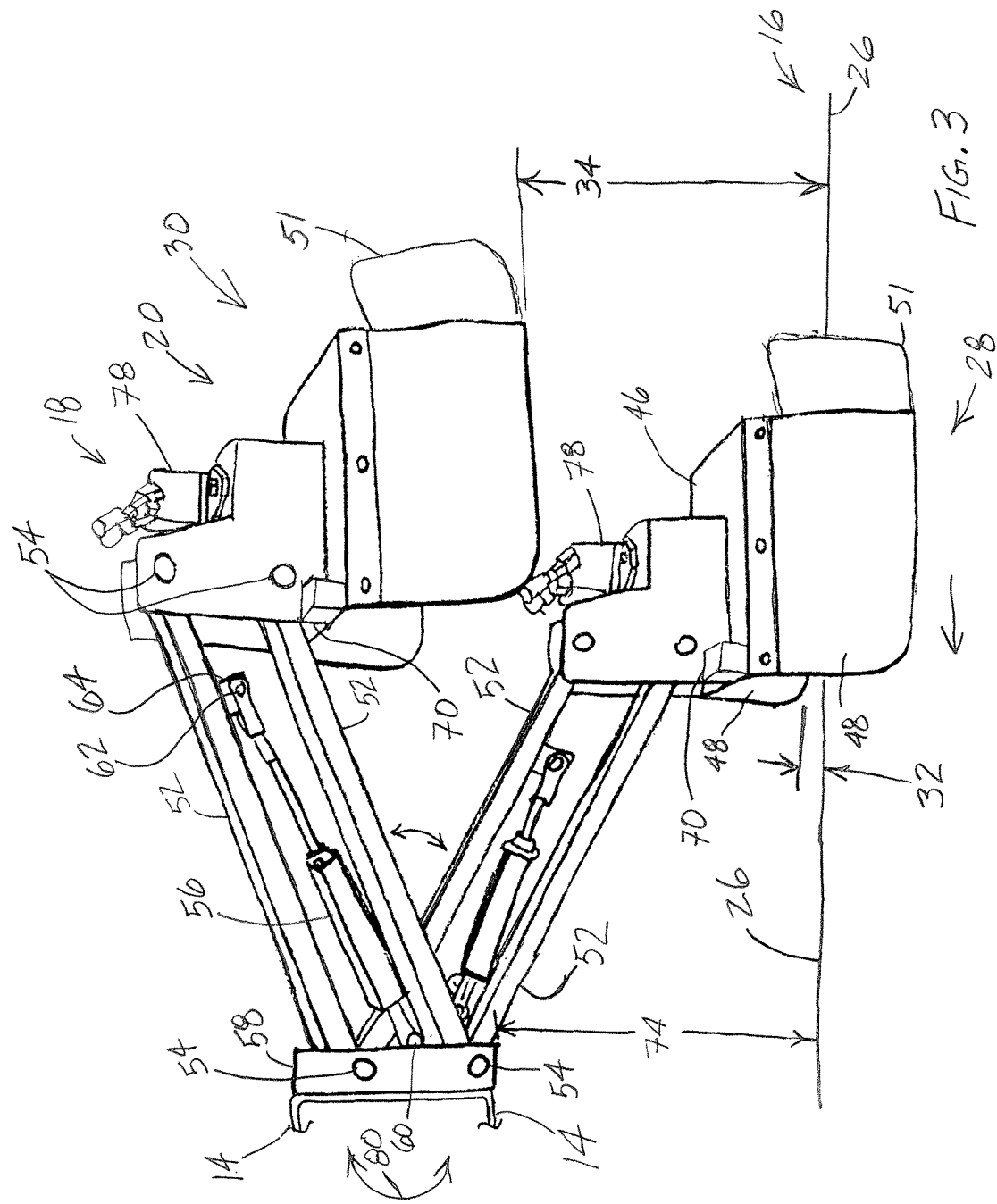
FIG. 3 is an upper perspective view of an exemplary agricultural device, according to the present disclosure.

As shown in FIG. 3, mowing device or agricultural device 10 has a frame 14 such as a three point hitch or hook-up onto a tractor 12 (FIG. 1). The bottom of frame 14 is separated from the ground or support surface 26 of field 16 by a distance commonly referred to as clearance 74, such as 32 inches in one application, although the extent of the clearance can be different, based upon the application. Agricultural device 10 utilizes a drive system 76, such as a self-contained hydraulic system 76 having hydraulic motors 78 to rotatably drive mower modules 20, which drive system 76 being driven by the tractor 12 (FIG. 1) power take-off ("PTO"). Although agricultural device 10 may include one mower module 20 in one embodiment, in other embodiments, agricultural device 10 may include a plurality of mower modules 20, such as six or eight or more. In one embodiment, frame 14 is carried at a stationary height or frame clearance 74 in order to minimize PTO alignment problems.

As further shown in FIG. 3, each mower module 20 includes a dedicated drive source 56, such as a hydraulic cylinder for raising and lowering its corresponding mower module 20. In one embodiment, the drive source 56 may include a motor, such as an electric motor, or other suitable motor. A set of parallel links 52, including opposed pivot connections 54 extend between frame 14 and a head 18 of a corresponding mower module 20. One end 62 of the hydraulic cylinder 56 is pivotably connected to one of the parallel links 52 such as by a tab 64 welded to a corresponding parallel link 52, and the other end 60 of the hydraulic cylinder 56 is pivotably connected to the frame 14. In one embodiment, frame 14 may include L-brackets or support members 58. Decreasing the distance between opposite ends 60, 62 of the hydraulic cylinder 56 urges the mower module toward a lowered position 28. Lowered position 28 corresponds to a clearance or spacing 32 between mower module 20 and support surface 26 of field 16 for cutting plant matter 22, yielding cut plant matter 23 (FIG. 2). In one embodiment, spacing 32 may be zero. Conversely, increasing the distance between opposite ends 60, 62 of the hydraulic cylinder 56 urges the mower module 20 toward a raised position 30. The hydraulic cylinders 56 can be controlled by the tractor's hydraulic system.

During operation in the field 16, the blades 38 of mower modules 20 continue to rotate, even after the tractor 12 (FIG. 1) has travelled the entire length of a crop row, such as crop row 72 (FIG. 1). That is, upon reaching the end of a crop row 72, the tractor 12 and mowing device 10 will execute a turn at the end of the row in preparation of travelling down the adjacent row in the opposite direction. In order to avoid damaging the crop canopy with the rotating blades 38 of the mower modules 20 during this maneuver, the mower modules 20 must be raised to a raised position 30 having a spacing or distance or module clearance 34, such as 36 inches, which is sufficient to achieve module clearance 34. It is to be understood that module clearance 34 can vary, depending on the application. Conventional agricultural apparatus is raised and lowered as a single unit, such as a cultivator, by three point hitch or hook-up. However, the three point hitch or hook-up is incapable of raising the agricultural apparatus to achieve the necessary clearance required for this mower application.

The same system used to lift mower modules 20 is also used to allow each mower module 20 to follow the ground terrain of the field 16 (FIG. 1). In one embodiment, an accumulator (not shown in FIGS.) can be positioned in the lift side of the modules' hydraulic system to create adjustable lift up pressure to lighten mower modules 20 for ease of clearing obstacles in the field ground terrain.

Figure 4:
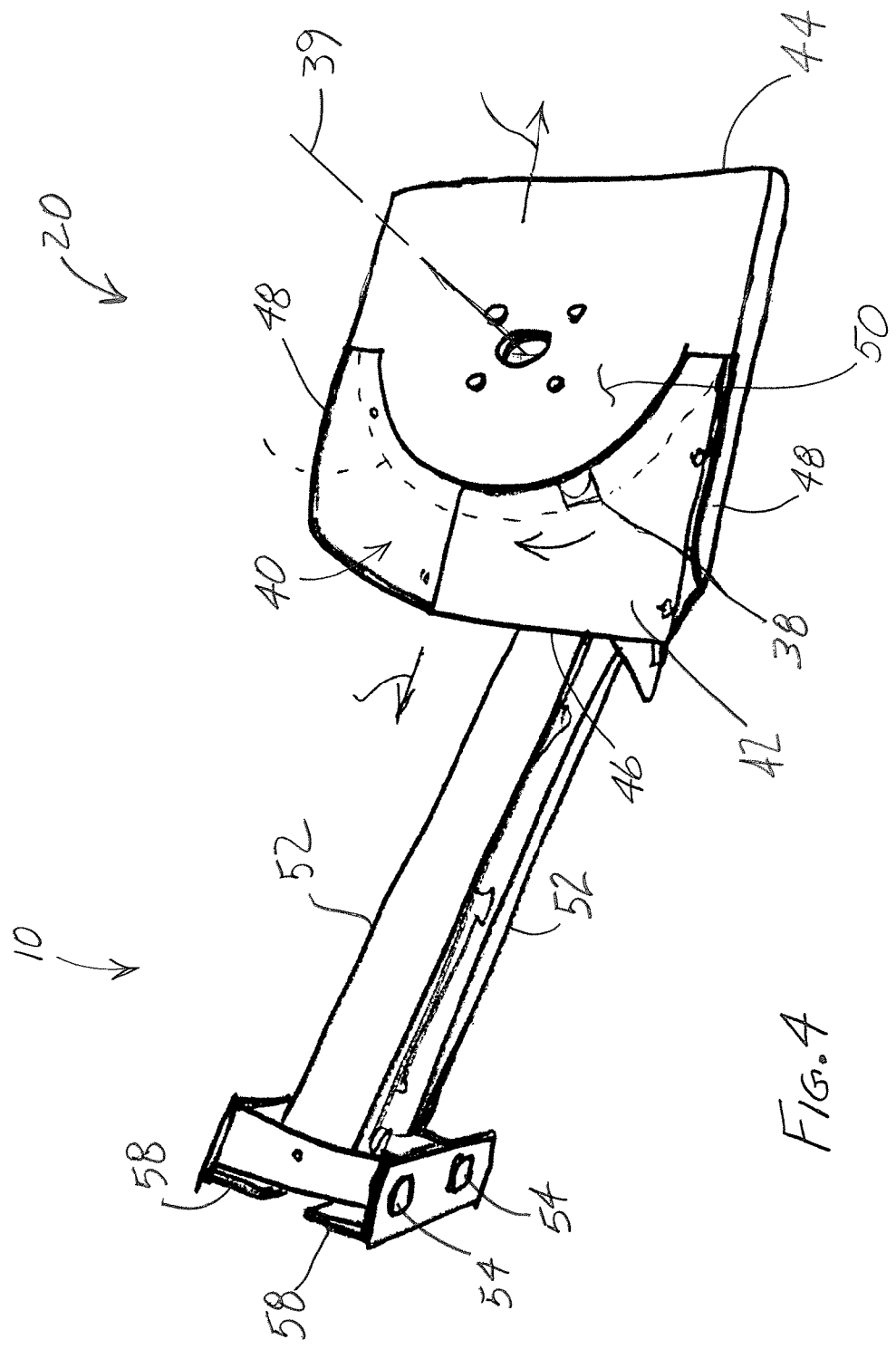
FIG. 4 is an upper perspective view of an inverted agricultural device according to the present disclosure.

The mower modules 20 utilize replaceable blades 38 (FIG. 4). For example, two blades 38 that rotate within the mower module 20 at high rotational speed. In one embodiment, the blade may be a single blade. Applicant's initial testing has revealed, that blade rotational speed is not sensitive to tractor traveling speed.

The orientation or tilt of the mower modules 20, front or back relative to a horizontal plane, will determine how close to the ground the blades of the mower module 20 will cut. In one embodiment, the orientation or tilt of the mower modules 20 can be adjusted by adjusting the top link in the three point hook-up, shown in FIG. 3 as rotational movement 80 at the tractor (FIG. 1) previously mentioned.

As shown in FIGS. 3 and 4, mower module 20 is capable of cutting into the cover crop mat 24 (FIG. 2) and remulching or fluffing the existing residue, as desired. Head 18 of mower module 20 includes a top surface 46 that separates opposed sidewalls 48 extending downwardly therefrom. A deflector 51 extends from a rear or trailing end of one or both sidewalls 48 for guiding expelled plant matter 25 from the mower module 20. The mower module 20 includes a wear plate or wear surface 50 opposite the top surface 46 extending between the sidewalls 48, with the top surface 46, sidewalls 48 and wear surface 50 defining a periphery of a chamber 40 having openings 42, 44 at respective forward and rear ends of the chamber. The mower blades 38 are positioned within the chamber 40 near the wear plate. The mower blades extend radially outward from the wear plate 50 for at least a portion of the rotational path of the mower blades 38, defining a cutting region 82. At least a portion of the sidewalls 48 extend forward of a rotational axis 39 of the mower blades to prevent expelled plant matter 25 (FIG. 2) from harming the cash crop. For reasons of safety, the openings 42, 44 corresponding to the front and rear ends of the mower module 20 are covered in a known manner and are not further discussed herein.

FIG. 5 shows an end view of an exemplary agricultural device 10 positioned relative to multiple crop rows 72. For purposes of clarity in FIG. 5, agricultural device 10 is adapted to mow around six crop rows, i.e., an outer row 72A, a row 72B adjacent to outer row 72A, a row 72C adjacent to row 72B, a row 72D adjacent to row 72C, a row 72E adjacent to row 72D, and an opposed outer row 72F adjacent to row 72E. In other words, in order for agricultural device 10 to properly mow around six crop rows (i.e., crop rows 72A-72F), there must be an additional mower module 20, i.e., seven mower modules 20, as the mower modules must mow around both sides of each crop row, including each outer crop row 72A, 72F. During operation of agricultural device 10, mower blades 38 (not shown in FIG. 5) of mower modules 20 cut plant matter 22, and possibly at least a portion of mat 24 of residual plant matter, leaving plant matter 23. Mat 24 includes gaps 84 formed to accommodate each crop row, which gaps 84 being formed while mat 24 was being formed. Each crop row has a centerline, such as centerline 86 for outer crop row 72A, and centerline 88 for crop row 72B, with the distance between adjacent crop rows 72A, 72B defining crop row gap 90, such as 30 inches, although the crop row gap may vary depending upon the application. Mower modules 20 have widths 96 correspondingly sized, such as 20 inches, for the desired crop row gaps 92, 94 between mower module 20 and surrounding crop rows 72A, 72B, such as 5 inches in the present embodiment. Crop row gaps 92, 94 should be sufficiently large so as not to damage the adjacent crop rows 72A, 7B, and additionally accommodate a travel path deviation", sometimes referred to as "drift," such as a transverse deviation of agricultural device 10 from a predetermined travel path of the agricultural device 10. In one embodiment, a guidance system 70 may be utilized, such as by securing guidance system modules 71 for maintaining alignment of the mower modules 20 despite the travel path deviation by the tractor 12 (FIG. 1) as is well known for guided cultivating.

While the invention has been described with reference to a preferred embodiment, it will be understood by those skilled in the art that various changes may be made and equivalents may be substituted for elements thereof without departing from the scope of the invention. In addition, many modifications may be made to adapt a particular situation or material to the teachings of the invention without departing from the essential scope thereof. Therefore, it is intended that the invention not be limited to the particular embodiment disclosed as the best mode contemplated for carrying out this invention, but that the invention will include all embodiments falling within the scope of the appended claims.

What is claimed is:

1. An agricultural device associated with reduced tillage techniques in a field, comprising:
   a frame;
   at least one mower module supported by the frame, the at least one mower module positionable to cut plant matter between adjacent crop rows in the field;

wherein the at least one mower module having at least one mower blade having a rotational axis and positioned in a chamber having opposed openings to receive/expel plant matter, the openings generally facing toward and away from a travel direction, respectively, of the device;

a periphery of the chamber defined by a support surface supporting the device, sidewalls, and a wear surface extending between the sidewalls, the support surface positioned opposite the wear surface and separated from the wear surface by the sidewalls;

wherein the wear surface extending between lower edges of the sidewalls below the mower blade, and having a portion of the wear surface intersecting the rotational axis of the mower blade.

2. The device of claim 1, wherein the frame is operatively connected to an implement or vehicle.

3. The device of claim 1, wherein the device is used in combination with another implement.

4. The device of claim 1, wherein the device is used without other implements.

5. The device of claim 1, wherein the at least one mower module cuts both plant matter and the mat.

6. The device of claim 1, wherein the at least one mower module comprising one mower module and another one mower module independently movable between corresponding first and second positions having different spacings from a support surface supporting the device.

7. A method for achieving reduced tillage techniques in a field using the device of claim 1, comprising:
    forming at least two strips of exposed soil in residual plant matter in the field;
    at least partially crushing stems of residual plant matter while maintaining the strips, the at least partially crushed residual plant matter forming a mat;
    planting crops in the strips, forming crop rows; and
    cutting plant matter between adjacent crop rows in the field, wherein the plant matter having penetrated the previously formed mat of at least partially crushed residual plant matter.

8. The device of claim 1, further comprising a guidance system module of a guidance system secured to the at least one mower module for maintaining alignment of the at least one mower module between adjacent crop rows in response to a travel path deviation of the device from a predetermined travel path of the device.

9. The device of claim 1, wherein the at least one mower blade is positioned near the wear surface.

10. The device of claim 1, wherein the at least one mower module includes parallel links pivotably connected between the at least one mower module and the frame; and
    a drive source having a first end and an opposed second end movable relative to each other, the first end pivotably connected to the frame and the second end pivotably connected to at least one of the parallel links;
    wherein in response to a change in a distance between the first end and the second end, the mower module is movable between corresponding first and second positions having different spacings from a support surface supporting the device.

11. An agricultural device associated with reduced tillage techniques in a field, comprising:
    a frame;
    at least two mower modules supported by the frame, the at least two mower modules positionable to cut plant matter at at least one of between adjacent crop rows in the field, and between an outer crop row and an adjacent crop row in the field and along a side of the outer crop row opposite the adjacent crop row;
    wherein each of the at least two mower modules having at least one mower blade having a rotational axis and positioned in a chamber having opposed openings to receive/expel plant matter, the openings generally facing toward and away from a travel direction, respectively, of the device;
    a periphery of the chamber defined by a support surface supporting the device, sidewalls, and a wear surface extending between the sidewalls, the support surface positioned opposite the wear surface and separated from the wear surface by the sidewalls;
    wherein the wear surface extending between lower edges of the sidewalls below the mower blade, and having a portion of the wear surface intersecting the rotational axis of the mower blade.

12. The device of claim 11, wherein the at least one mower blade is positioned near the wear surface.

13. The device of claim 11, wherein the frame is operatively connected to an implement or vehicle, and the device is used in combination with another implement or is used without other implements.

14. The device of claim 11, wherein the at least two mower modules cut both plant matter and the mat.

15. The device of claim 11, wherein the at least two more modules comprising one mower module and another one mower module independently movable between corresponding first and second positions having different spacings from a support surface supporting the device.

16. The device of claim 11, wherein each mower module of the at least two more modules includes parallel links pivotably connected between a corresponding mower module and the frame; and
    a drive source having a first end and an opposed second end movable relative to each other, the first end pivotably connected to the frame and the second end pivotably connected to at least one of the parallel links;
    wherein in response to a change in a distance between the first end and the second end, each mower module of the at least two more modules is movable between corresponding first and second positions having different spacings from a support surface supporting the device.

* * * * *